United States Patent [19]
Pourian

[11] 3,884,039
[45] May 20, 1975

[54] HYDRAULIC PUMP WITH HORSEPOWER LIMITER

[75] Inventor: Reza Pourian, Wauwatosa, Wis.

[73] Assignee: The Oilgear Company, Milwaukee, Wis.

[22] Filed: May 20, 1974

[21] Appl. No.: 471,606

[52] U.S. Cl. .................. 60/445; 60/447; 60/488
[51] Int. Cl. ............................................. F16h 39/46
[58] Field of Search .............. 60/445, 447, 488, 905

[56] References Cited
UNITED STATES PATENTS

| | | | |
|---|---|---|---|
| 2,283,321 | 5/1942 | Doe et al. | 60/905 X |
| 3,302,585 | 2/1967 | Adams et al. | 91/387 X |
| 3,660,975 | 5/1972 | Martin et al. | 60/447 |

*Primary Examiner*—Edgar W. Geoghegan
*Attorney, Agent, or Firm*—Lloyd LaFave

[57] ABSTRACT

The invention relates to an acceleration and deceleration control system that controls the stroke of a variable displacement pump to limit the horsepower and speed of a hydraulic motor subject to a high inertia load. The control includes a spring on a stroke control member that varies the bias force on a pilot operated valve that controls the supply of control fluid in a stroke control cylinder in response to pump delivery pressure and to pump stroke during acceleration of the motor; and in response to pump inlet pressure, to pump stroke, and to the pressure of control fluid during deceleration of the motor. A control pump being rotatable with the main pump may attain above normal speeds during a deceleration mode of operation to deliver control fluid at above normal pressures to limit the braking horsepower and speed of the hydraulic pump for controlled deceleration of the hydraulic motor.

9 Claims, 5 Drawing Figures

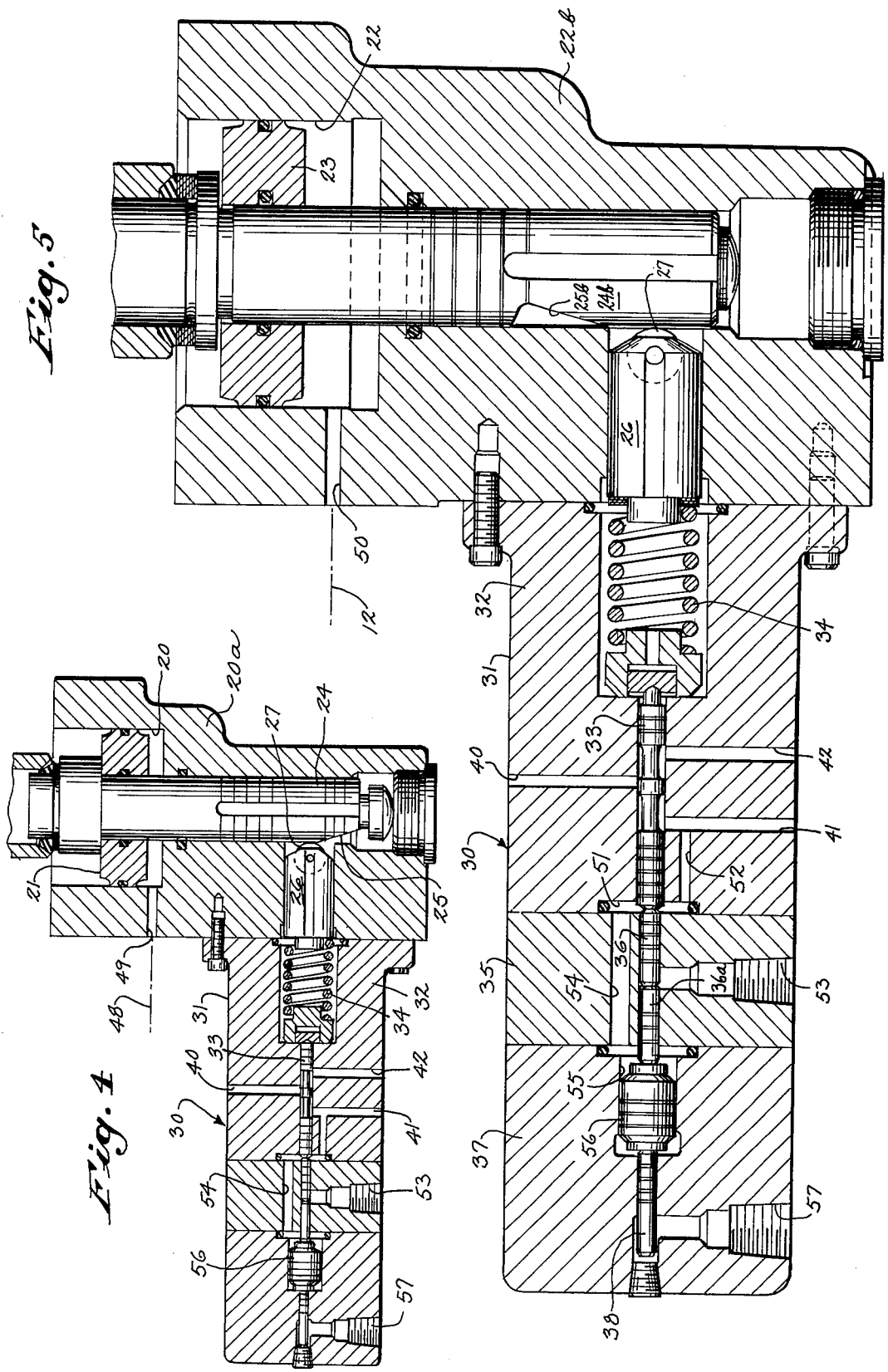

HYDRAULIC PUMP WITH HORSEPOWER LIMITER

PRIOR ART

A hydraulic transmission having a constant speed variable displacement pump hertofore employed a horsepower control limiting system that imposed maximum horsepower demand on the prime mover for the hydraulic pump throughout the initial range of acceleration of a load hydraulic motor coupled to drive and accelerate a relatively high inertia load device. Since the pump in such a transmission during initial accelaration of the load delivers more equivalent horsepower than the load hydraulic motor could absorb, the excess power is spilled as pressure fluid over a pressure relief valve until the load motor can absorb and deliver the critical horsepower. See for example a pump employing a horsepower or torque control limiting control described in U.S. Pat. Nos. 2,283,321 and 3,302,585.

SUMMARY OF THE INVENTION

The invention relates to a hydraulic control of a variable displacement pump in a hydraulic transmission whose fixed displacement hydraulic motor must accelerate or decelerate a load having a large mass and a large moment of inertia. The hydraulic pump is driven at substantially constant speed by a prime mover. The transmission has sufficient capacity to accelerate the load rapidly at maximum torque without imposing unnecessary horsepower demand on the prime mover while the speed of the motor increases to deliver the initial or limiting horsepower.

This capacity is desirable in order to reduce the time required for acceleration to maximum speed, or to decelerate therefrom, provided the control as described herein provides a maximum rate of acceleration at constant torque without wasting horsepower until the critical horsepower is attained; and the control then reduces the rate of acceleration to hold the horsepower constant until the maximum motor speed is attained.

Upon deceleration control, the hydraulic motor acts as a pump and the pump acts as a hydraulic motor that delivers regenerative power to the prime mover and limits the braking horsepower thereof to prevent the pump from operating at an excessive speed. In the event deceleration occurs due to failure of power to the prime mover, the control effects similar hydraulic braking without the benefit of torque resistance of the prime mover providing regenerative braking.

During acceleration, control pressure fluid is metered to the pump stroke control cylinder, first to hold pump delivery pressure constant at a predetermined operating pressure until a load speed is attained at which the critical horsepower is imposed on the drive, then to reduce pump delivery pressure with further increase in pump stroke so as to hold the horsepower constant until maximum speed is attained. Sustaining full speed imposes a smaller horsepower requirement on the prime mover.

During deceleration, control pressure fluid is metered from the pump stroke control cylinder first to permit back pressure on the pump to increase with decrease in pump stroke until a predetermined back pressure is reached, then pump stroke is further reduced to hold the back pressure constant until a preset minimum stroke of the pump is attained, whereby neither the braking horsepower of the pump nor its speed shall exceed predetermined maximum values.

In the present arrangement a pilot operated valve has a control port in communication with a stroke control cylinder of the pump, and another port connected through a directional valve either to drain or to receive control fluid from a gear pump. The valve member of the pilot valve is variably biased by a follower spring, in accordance with the stroke of the pump, in a direction to open the control port to the other port of the valve, and the valve member is urged against the spring by pilot plungers in accordance with the pressures across the pump, so as to tend to close the control port to the other port. For start-up of the pump and for a deceleration control of the drive system, the directional control valve connects the other valve port, and the control cylinder open thereto, to drain. For an acceleration mode of operation, the directional valve is reversed, thus changing the logic of operation of the pilot operated valve, thereby connecting the other valve port, and the control cylinder open thereto, to receive control pressure fluid from the gear pump.

The pressures on the pilot plungers of the pilot operated valve cause the valve member to tend to close the control port to the other port to meter control fluid therebetween. During deceleration control this regulates the rate that fluid is drained from the control cylinder, and during acceleration control, this regulates the rate that control fluid is admitted thereto.

It is an object of the invention to provide a hydraulic transmission having a variable displacement pump supplying motive fluid to a hydraulic motor under high inertia load with displacement control means that permits maximum acceleration of the motor without exceeding a predetermined maximum horsepower. Another object is that the control permit the pump to provide rapid deceleration of the motor with controlled dynamic braking while limiting the pump to a predetermined maximum speed and braking horsepower.

Another object is that the control for metering control fluid to and from the stroke control cylinder for the pump be responsive to the pressure across the pump and to the position of the stroke control member.

Other objects and advantages will be apparent from the description and illustration of a preferred embodiment of the invention.

BRIEF DESCRIPTION OF THE DRAWING

FIG. 4 is a cross-sectional view of a pilot operated valve on a stroke control cylinder for a pump employed in FIG. 1; and FIG. 5 is a modification showing the pilot operated valve of FIG. 4 mounted on a pump bias cylinder.

DESCRIPTION OF EMBODIMENT OF THE INVENTION

Figure 1:
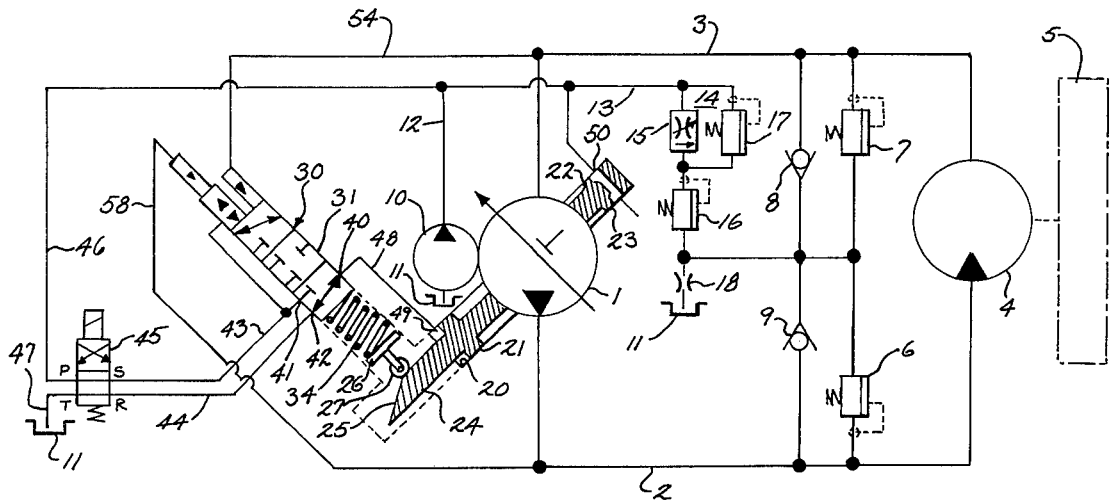
FIG. 1 is a schematic circuit for a hydraulic transmission embodying the present invention.

Referring to FIG. 1, the hydraulic transmission has a variable displacement hydraulic pump 1 connected by pump delivery line 2 and pump return line 3 in a closed loop circuit with a fixed displacement hydraulic motor 4 coupled to a high inertia load 5. A prime mover such as an electric motor, not shown, drives the pump 1 at a constant speed. System high pressure relief valves 6, 7 and check valves 8, 9 are connected across the lines 2, 3, such that over pressure in line 2 is relieved by relief valve 6 and conducted through check valve 8 to line 3, and over pressure in line 3 is relieved by relief valve 7 and conducted by check valve 9 to line 2.

An auxiliary pump such as a gear pump 10 is rotatable with the main pump 1 to provide a source of control pressure fluid and to provide make-up fluid to the low pressure side to the pump 1. Gear pump inlet is connected to a return source of fluid, reservoir 11. Gear pump delivery, line 12, is shunted by bypass means 14 connected to a line 13 and comprises an adjustable pressure compensated flow limiting means 15 in series with a low pressure relief valve 16 connected to return 11 through a flow rstriction 18 and also connected to the interconnection of the check valve 8, 9 and relief valves 7, 8. A relatively high pressure relief valve 17 is connected across the pressure compensated flow limiting means 15 to conduct excess control fluid to the low pressure relief valve 16.

Pump 1 has a displacement member positioned by a servomotor comprising a pair of opposed cylinders and pistons, one being a control cylinder 20 with a control piston 21, and the other being a bias cylinder 22 with a bias piston 23. Bias piston 23 is overcome by the control piston 22 when each are subject to equal pressures.

A pilot operated valve 31 is associated with the servomotor to meter control fluid to the control cylinder 20 to increase pump stroke and to meter control fluid from the control cylinder to decrease pump stroke. The pilot operated valve includes spring means providing a bias force on its valve member to urge it in one direction and pilot force means to urge its valve member in the opposite direction to oppose the spring means. The spring means acts between the valve member and the servomotor so that at a predetermined pump stroke further increased in pump stroke reduces the bias force of the spring on the valve member to decrease the rate that control fluid is metered to the control cylinder.

The spring means shown comprises a follower spring 34 acting between the valve member 33 and a piston of the stroke positioning servomotor. A cam 24 is formed on a rod extension of the control piston 21, FIGS. 1 and 4. The cam 24 has a cam surface with a portion parallel to the axis of the piston 21 of the servomotor and a portion 25 inclined thereto. A cam follower 26 comprises a piston with a roller 27 on one end, fitted in a bore in the end head of the cylinder 20 and at a right angle to the axis of the piston 21, surface of the cam 24, rolls down its inclined surface 25 as the piston 21 increases the stroke or displacement of the pump 1.

A pilot operated valve assembly 30 is mounted on the end head of the cylinder 20 with its axis aligned with the axis of the cam follower 26. The valve assembly 30 comprises the pilot operated valve 31 having a valve body 32 with a valve member 33, a block 35 housing a deceleration control plunger 36 and mounted on the valve body 32, and a block 37 housing an acceleration control plunger 38 and mounted on the valve block 35, with the plungers arranged in tandem in alignment with one another and with the valve member 33 of the pilot valve 31. The follower spring 34 is disposed in a counterbore in the valve body 32 in abutment with the valve member 33 at one end and in abutment with the cam follower 26 at the other end. The follower spring 34 urges the valve member 33 to the position shown in FIGS. 1, 3 and 4, wherein the intermediate or control land of the moveable valve member normally blocks control port 40 from first port 41 but leaves control port 40 slightly open to second port 42.

The pilot operated valve 31 has a control port 40 intermediate spaced apart first and second ports 41, 42, coonnected respectively by lines 43, 44 to a directional flow control or reversing valve 45 that has an inlet line 46 connected to the gear pump delivery line 12 and has a return line 47 to reservoir 11. The pilot valve control port 40 is connected by a line 48 to port 49 of the control cylinder 20. The opposing or bias cylinder 22 has a port 50 connected to gear pump delivery line 12 so as always to by subject to the pressure of the control fluid.

The valve body 32 has a shallow counterbore 51 adjacent deceleration block 35 and is connected by a passage 52 to the first valve port 41, so that control pressure fluid when applied to port 41 acts on the end of the valve member 33 in opposition to follower spring 34.

The deceleration block 35 has a two-part plunger consisting of deceleration control plunger 36 and a spacer 36a with a port 53 open therebetween and connected by a line 54 to the return line 3 to pump 1, so that back pressure on pump 1 urges deceleration control plunger 36 in opposition to follower spring 34.

The deceleration block 35 has a two-part plunger consisting of deceleration control plunger 36 and a spacer 36a with a port 53 open therebetween and connected by a line 54 to the return line 3 to pump 1, so that back pressure on pump 1 urges deceleration control plunger 36 in opposition to follower spring 34.

The acceleration block 37 contains the acceleration control plunger 38 and a port 57 adjacent the remote end thereof connected by a line 58 to delivery line 2 of pump 1 so that pump delivery pressure urges the acceleration control plunger 38 to oppose the follower spring 34. A release plunger 56 is fitted in a counterbore 55 in block 37 in abutment with the acceleration control plunger 38 and with the spacer 36a of the deceleration control plunger. The counterbore 55 is connected by the passage 54 in the adjacent block 35 to the counterbore 51 and thereby via passage 52 to the first port 41 of the pilot valve, so that control pressure admitted thereto displaces the release plunger which displaces and isolates the acceleration control plunger from pilot control.

The reversing valve 45, FIG. 1, is a two position, spring return type, with a remotely controlled operator such as a solenoid operator shown in deenergized position to conduct control fluid from gear pump 10 to the first port 41 of the pilot operated valve 31, and to connect port 42 thereof to the return as via reservoir 11, to the gear pump 10.

Associated with the control and opposing cylinders 20, 22 for pump stroke or dieplacement are suitable well known stroke limiting means, not shown, for predetermining minimum and maximum stroke of the pump 1.

A modification shown in FIG. 5 consists of the pilot operated valve assembly 30 being mounted on the end housing 22b of the opposing or bias cylinder 22 of the stroke control servomotor, in which the cam 24b is a rod extension of the opposing or bias piston 23. The inclined surface of cam 24b carried by the bias piston 23, FIG. 5, is inclined toward the displacement member of the pump 1, whereas such surface on cam 24 carried by the control piston 21, FIG. 4, is inclined away from the displacement member of the pump 1. The function of the inclined surfaces of cam 24 and of cam 24b are the same, to decrease the bias force on the follower spring 34 of the pilot operated valve 31 with increase in pump stroke. The hydraulic control circuit for FIG. 5 is the same as for FIG. 4, in which the gear pump 10 is connected directly to the bias cylinder 22 to urge pump displacement toward minimum stroke, and in which gear pump 10 is operatively connected to the control cylinder 20 through the pilot operated valve 31 and the reversing valve 45.

OPERATION

On start-up of the prime mover the pump remains at neutral or zero stroke. The control cylinder 20 is connected to drain through the pilot operated valve 33 and the reversing valve 45. Control fluid is directed to the opposing cylinder 22 to act on its bias piston 23 and urge the pump toward zero stroke. At this time the only force on the valve member 33 of the pilot operated valve 31 is that of the bias spring 34 which thus positions the valve member 33 so that valve control port 40 is interconnected with port 42 thereof, and this port is connected through the reversing valve 45 to drain.

For an acceleration mode of operation of the drive, the reversing valve 45 is operated to reverse its connections to the valve ports 41, 42 of the pilot operated valve 31 to deliver control fluid to port 42 which is open to control port 40 and deliver control fluid to the control cylinder to urge the pump on stroke.

Pressure on the pump at pump delivery immediately rises to full pressure as controlled by the pilot operated valve 31. Pump delivery pressure acts on the acceleration control plunger 38 in opposition to the bias spring 34 of the pilot operated valve so that the valve member 33 tends to wither close the control port 40 or to partially close it to meter control fluid to the control cylinder 20 for a predetermined rate of increase in pump stroke and therefore determines the rate of acceleration of the hydraulic motor.

At a predetermined pump strike, at which pump delivery pressure and flow are representative of a predetermined maximum hosepower, the cam that moves with the stroke control piston presents an inclined surface to the axis of follower spring 34 to thereafter reduce its bias force on the valve member 33 with increase in pump stroke so that less pump delivery pressure will modulate the valve member between closed and open positions, thereby decreasing pump delivery pressure with increase in pump stroke so that the product of pressure and flow is maintained constant until a predetermined maximum pump stroke is attained. Thus during acceleration, once the limiting horsepower is attained, it is maintained constant until maximum speed of the drive is attained.

Figure 2:
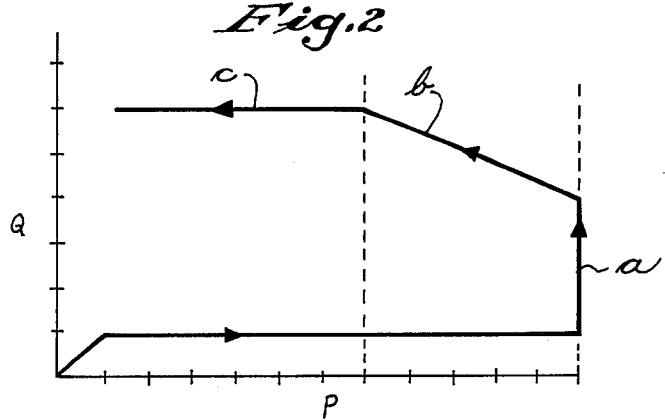
FIG. 2 is an illustrative curve of pump displacement and pump pressure for the transmission of FIG. 1.
Figure 3:
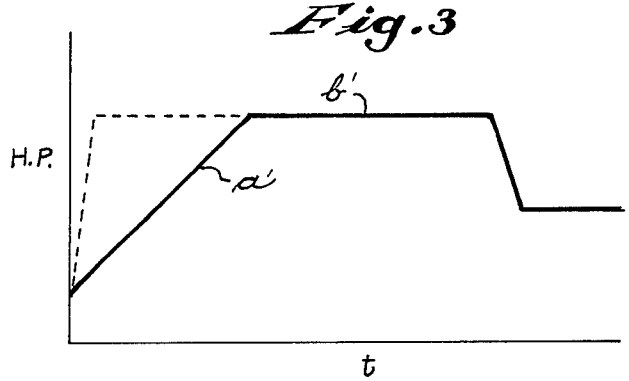
FIG. 3 is an illustrative curve of horsepower with respect to time as imposed on a prime mover for the pump of FIG. 1.

This operating control function is illustrated by the curves of FIGS. 2 and 3 which respectively are the strokepressure characteristic of pump 1 and the horsepower-time characteristic that the drive imposes on the prime mover electric motor for the pump 1, or may be viewed as the horsepower-time characteristic of the transmission. For these curves, Q represents pump displacement or pump stroke or volume of flow of motive fluid, P represents the pressure of the motive fluid, HP represents horsepower, and $t$ represents time. In the curves; portion $a$ occurs during maximum pressure during increasing pump displacement until a predetermined pump displacement or pump stroke is attained or determined when the cam follower is at the knee of the cam surface; portion $b$ occurs during decreasing pressure with increasing pump displacement, as the cam follower moves down along the inclined surface of the cam, until a predetermined maximum stroke is attained; and portion $c$ occurs during constant displacement at the predetermined maximum stroke.

For a deceleration mode of operation, the reversing valve 45 is reversed by deenergizing its solenoid and its return spring brings it to the positions hown in the drawing, wherein port 41 of the pilot operated valve receives control pressure fluid and port 42 thereof is connected to return. Control pressure fluid is also thereby directed to act on the release plunger 56 to isolate the acceleration control plunger 38 and is also directed to act on the end of the valve member 33 to urge it in opposition to its bias spring 34. The pump 1 immediately tends to go to short stroke causing the back pressure on the pump to rise thus causing the pump to tend to increase its speed. The auxiliary pump 10 being rotatable with the pump 1 also tends to increase its speed and its output.

During normal braking occuring with power to the prime mover its speed stays within a normal range and thus also the speed of the auxiliary pump. The flow limiting means 15 in the output circuit of the auxiliary pump being adjusted to pass the output within the normal range of speed thus remains inoperative to raise the pressure of the control fluid above that of the pressure setting of the low pressure relief valve. The pressure of the control fluid acts on valve member 33 and the back pressure of the pump 1 acts on the deceleration control plunger 36 and together urge the valve member 33 against the spring 34 to control the rate that fluid is metered out of the control cylinder 20 and thus control the rate of deceleration of the load motor 4 and the braking provided by the pump 1. The control provides normal braking without the back pressure on the pump requiring relief by the high pressure relief valve 7.

In the event that deceleration control is initiated or occurs when there is no power to the prime mover for the pump 1, the deceleration control functions in the same manner described for normal braking. However, without the dynamic torque resistance provided by the prime mover, the overhauling load of the motor 4 will drive the pump 1 and the gear pump 10 at above the normal range of speed, and the gear pump will deliver control fluid at a rate exceeding the flow capacity of the flow limiting means 15. The control pressure will therefore rise and be limited by the higher pressure setting of relief valve 17 that shunts the flow limiting means 15. This will provide a greater control pressure as a pilot force on the valve member 33 of the pilot valve and reduce the rate of metering-out of control fluid from the control cylinder 20, thereby maintaining the pump sufficiently on stroke to prevent it from being driven at an excessive speed.

When braking is initiated at or near maximum pump stroke, the cam position is such as to provide minimum bias force by the follower spring 34. The opposing forces on the valve member 33 may then be sufficient to displace the valve member against the follower spring 34 so that valve control port 40 is opened to valve port 41 to admit control fluid to the stroke control cylinder and increase pump stroke. This will reduce the back pressure on the pump 1 and the speed of rotation of pump 1 and of the gear pump 10, since the pump 1 is now being driven by motive fluid supplied by the hydraulic motor 4 acting as a pump, and thereby reduces the pilot control forces so that the valve member moves toward the left, first to block the control port 40 and then to open the control port 40 to the port 42 to meter control fluid from the control cylinder 20 to drain at a controlled rate. Thus the deceleration control causes the pump to provide controlled dynamic braking of the drive. The curves of FIGS. 2 and 3 also are typical of characteristics during controlled braking afforded by the deceleration mode of operation.

It is a feature of the control that the pilot operated valve 31 control the metering of control fluid to the control cylinder during acceleration of the drive and control the metering of control fluid from the control cylinder during deceleration of the drive, and that such control be effective below the pressure settings of the system relief valves 6, 7. For example, a pump 1 intended to deliver pressure up to 3,000 PSI, having an overpressure relief valve set at 3,500 PSI, having an auxiliary pump normally delivering pressure at 300 PSI during acceleration of the drive and to 1,000 PSI during deceleration of the drive, has a pilot operated valve whose components are sized accordingly. If pump delivery pressure exceeds 3,000 PSI, the acceleration plunger 38 subject to said pressure, causes the valve member to block the control port 40. If the pressure overshoots said value appreciably the valve member 33 will open control port 40 to drain until normal metering-in is restored. The release plunger 56 when subjected to control pressure overrides the acceleration control plunger at any time. The combined forces on the valve member 33 due to pump back pressure on the deceleration plunger 36 and control pressure on the valve member 33 during deceleration when the back pressure on the pump exceeds, for example, 3,200 PIS will cause the valve member to block the cylinder control port from the drain port, and overshooting of such pressure will open the control port 40 to control pressure fluid, until normal metering-out is restored between control port 40 and port 42.

I claim:

1. A hydraulic transmission comprising a variable displacement pump hydraulically connected to a hydraulic motor, an auxiliary pump to provide control pressure fluid;

said variable displacement pump having a displacement control member, opposed cylinder and pistons subject to control pressure fluid for positioning said displacement member;

said opposed cylinders and pistons comprising a bias cylinder connected to the auxiliary pump, a control cylinder having a larger area piston than said bias cylinder;

a pilot operated valve assembly comprising:

a pilot operated valve having a control port connected to said control cylinder, a first port connected by a reversing valve to a delivery port of the auxiliary pump and a second port connected by said reversing valve to a return for said auxiliary pump for effecting a deceleration mode of operation of the transmission, said control port normally being slightly open to said second port, means for shifting said reversing valve to reverse its connections to the first and second ports for effecting an acceleration mode of operation of the transmission, a movable valve member normally operable to control the opening of the control port with said second port, a follow-up spring acting between said valve member and one of said pistons positioning the displacement member whereby the bias force of said spring on said valve member is decreased with increase in pump displacement above a predetermined value, a tandem arrangement of pilot cylinders and plungers in line with said valve member for acting on one another and for urging said valve member against said spring, said arrangement comprising an acceleration control plunger, a release plunger, a two-part deceleration control plunger, and said valve member, a port at the end of said acceleration control plunger connected to a delivery port of said pump, a port between said two-part deceleration control plunger connected to an inlet port of said pump, a port between said release plunger and said deceleration control plunger and a port between said deceleration control plunger and said valve member each connected to said first port of said pilot valve.

2. The hydraulic transmission defined in claim 1 in which said reversing valve is positioned by operator means to select either an acceleration or deceleration control of the transmission andd is characterized in that in case of failure of said operator means said reversing valve is automatically positioned to command a deceleration control of the transmission.

3. A hydraulic transmission as defined in claim 1 in which said auxiliary pump is rotatable with said pump and is connected to a low pressure relief valve and to a relatively high pressure relief valve characterized in that the pressure of control fluid delivered by said auxiliary pump is limited by the low pressure relief valve when the auxiliary pump has a normal output rate, and is limited by said relatively high pressure relief valve when the auxiliary pump has an above normal output.

4. A hydraulic transmission as defined in claim 1 in which said auxiliary pump is connected in series with a flow limiting means and a low pressure relief valve operative to bypass the output of the auxiliary pump and limit the pressure thereof to the pressure setting of the low pressure relief valve when said auxiliary pump is driven at normal speed, and a high pressure relief valve connected across said flow limiting means to bypass excess control fluid and to limit the pressure thereof to the pressure setting of the high pressure relief valve when said auxiliary pump is driven at above normal speed.

5. In a hydraulic transmission having a variable displacement pump supplying motive fluid to a hydraulic motor driving a high inertia load that overhauls the hydraulic motor upon a deceleration control mode of operation and has an auxiliary pump to supply control fluid:

a pilot operated valve assembly operable for metering control fluid supplied by said auxiliary pump to and from a servomotor controlling the displacement of the variable displacement pump, said pilot operated valve assembly comprising:

a three-way valve having a control port for connection to the servomotor, first and second ports for connections to the auxiliary pump to receive and return control fluid thereto, a bias spring acting against said valve member so that said control port is normally blocked to said first port and normally slightly open to said second port, said bias spring having a cam follower for abutting a cam moveable with the servomotor to vary the position of the valve member upon predetermined movement of the servomotor, and a tandem arrangement of pilot cylinders and plungers in line with said valve member comprising an acceleration control plunger, a two-part deceleration control plunger abutting said valve member, and a release plunger positioned between said acceleration and deceleration control plungers, a port adjacent the remote end of said acceleration control plunger for connection to pump delivery, a port at the abutment of the two parts of said deceleration control plunger for connection to pump inlet, a port between said release and deceleration plungers connected to the first port of said three-way valve, and a port between deceleration plunger and said valve member connected to said first port of said three-way valve;

whereby, control fluid when directed to said first port of said three-way valve isolates said acceleration control plunger and urges said valve member against said spring in assistance to said deceleration control plunger, and whereby control fluid when directed to said second port of said three-way valve permits said acceleration plunger to urge said valve member against said spring.

6. The hydraulic transmission defined in claim 5 in which said cam is formed on an outward extension of said control piston and in which said pilot operated valve assembly is mounted on the housing for said control piston.

7. The hydraulic transmission defined in claim 5 in which said cam is formed on an extension of said bias piston and in which said pilot operated valve assembly is mounted on the housing for said bias piston.

8. The hydraulic transmission defined in claim 5 in which said cam has a surface portion parallel to the axis of the control piston and has a surface portion inclined to said axis and arranged so that during acceleration of the hudraulic motor said cam follower rides on said parallel portion until a predetermined maximum horsepower is attained and then rides on said inclined surface portion to hold the maximum horsepower constant until a predetermined maximum speed is attained.

9. A hydraulic transmission comprising a variable displacement hydraulic pump having a servomotor for varying pump displacement, a hydraulic motor hydraulically connected to said pump for driving a high inertia load, an auxiliary pump rotatable with said pump to supply control fluid to said servomotor, and means controlling the supply of control fluid, characterized by:

said auxiliary pump connected to a bypass means including a flow limiting means in series with a low pressure relief valve and in parallel with a high pressure relief valve to limit the pressure of the control fluid at a delivery port of the auxiliary pump to the operating pressure of the low pressure relief valve when said auxiliary pump delivers a normal flow of control fluid and to the operating pressure of the high pressure relief valve when said auxiliary pump delivers more than normal flow of control fluid;

a pilot operated valve having a control port connected to said servomotor to control the amount of control fluid in said servomotor;

said pilot operated valve having a valve member, a follower spring between said valve member and said servomotor to urge said valve member in one direction and to follow said servomotor to vary the position of said valve member with pump displacement, a pilot plunger means responsive to the pressure across said pump to urge said valve member against said follower spring, first and second ports one of which is operatively connected to said control port, another port between said pilot plunger means and said valve member connected to said first port;

and a reversing valve positioned to direct control fluid from said auxiliary pump to said first port of said pilot operated valve and to return control fluid from said second port, and operable to reverse the direction of flow of control fluid to said first and second ports.

* * * * *